United States Patent [19]

Moss et al.

[11] 4,408,729

[45] Oct. 11, 1983

[54] STAR DRAG SYSTEM FOR SPIN CAST REELS

[75] Inventors: Elvis W. Moss, Tulsa, Okla.; John T. Shackelford, Littleton, Colo.

[73] Assignee: Brunswick Corporation, Skokie, Ill.

[21] Appl. No.: 434,920

[22] Filed: Oct. 18, 1982

Related U.S. Application Data

[63] Continuation of Ser. No. 223,736, Jan. 9, 1981, abandoned.

[51] Int. Cl.³ .................... A01K 89/01; A01K 89/02
[52] U.S. Cl. .......................... 242/84.5 A; 188/72.7
[58] Field of Search ............... 242/84.5 A, 84.5 R, 242/84.51 A, 84.51 R, 84.2 A, 84.21 A, 99; 188/72.7, 72.8; 254/378

[56] References Cited

U.S. PATENT DOCUMENTS

| | | | |
|---|---|---|---|
| 3,061,230 | 10/1962 | Gayle | 242/84.5 A |
| 3,088,691 | 5/1963 | Hull | 242/84.5 A |
| 3,120,357 | 2/1964 | Wood, Jr. | 242/84.5 A |
| 3,146,965 | 9/1964 | Khazzam | 242/84.2 A |
| 3,697,011 | 10/1972 | Christensen et al. | 242/84.2 A |

Primary Examiner—Billy S. Taylor
Attorney, Agent, or Firm—John G. Heimovics

[57] ABSTRACT

This invention comprehends a spinning style fishing reel having a drag assembly that is actuated by a star drag wheel mounted on a common axis with a crank lever. A slide drag actuator of the drag assembly engages with a drag plate and is moved by the star drag wheel to increase or decrease the pressure applied by the drag plate on the line spool.

11 Claims, 7 Drawing Figures

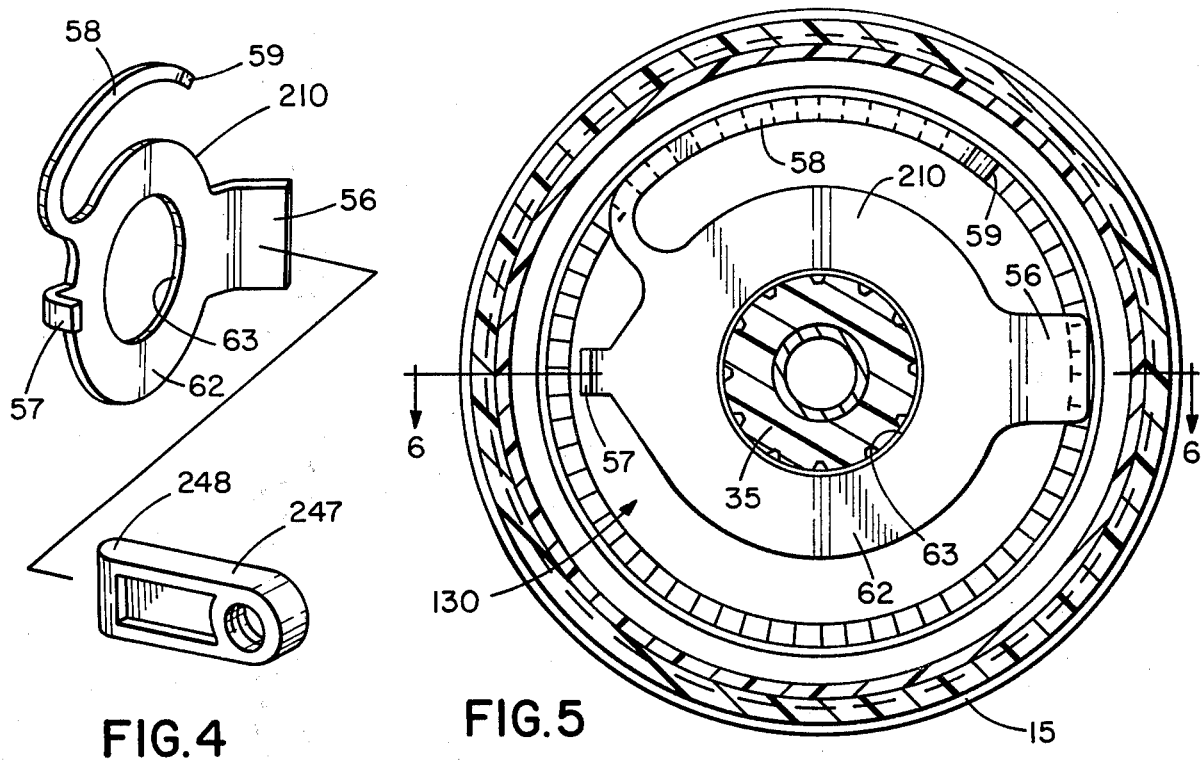
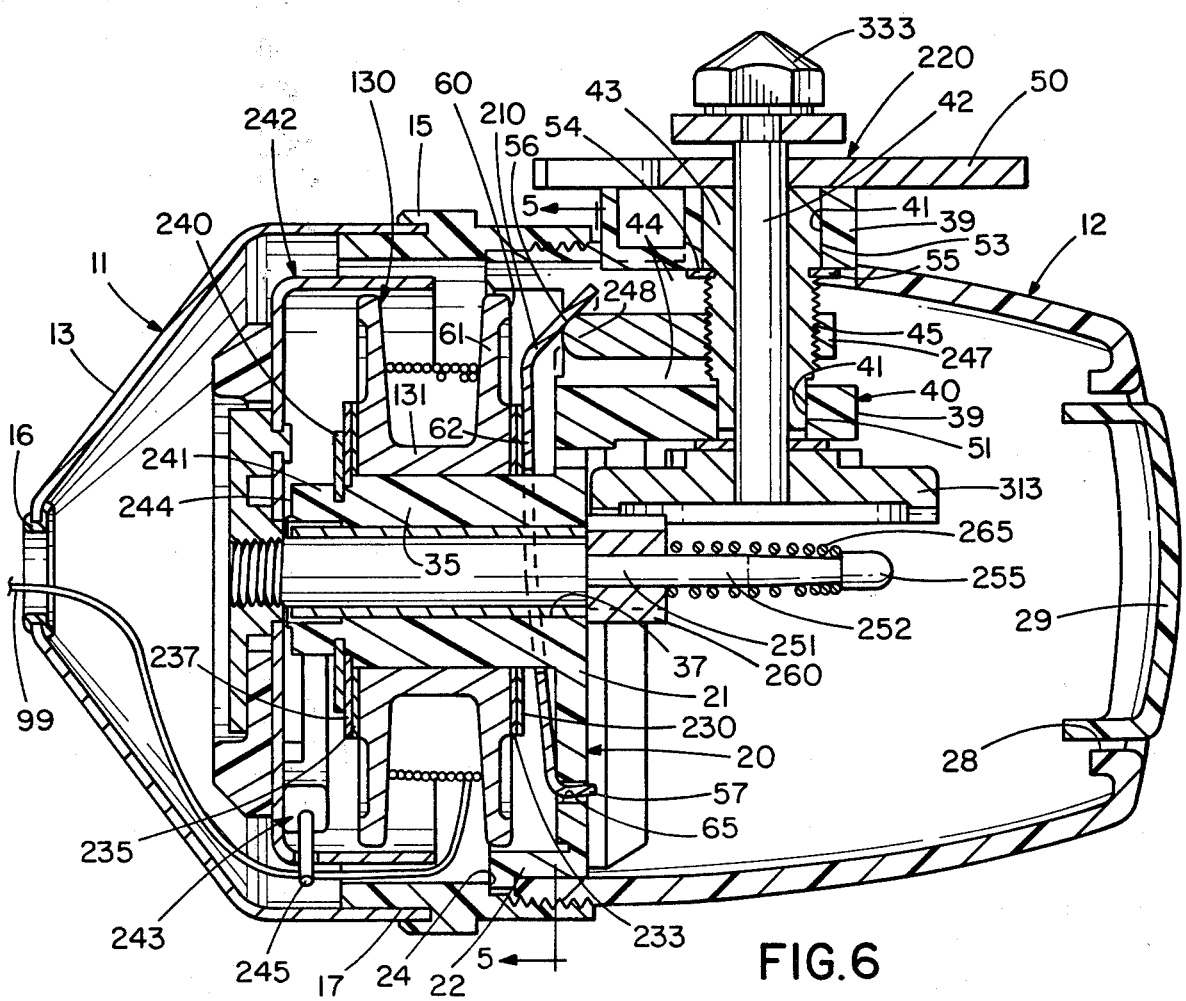

STAR DRAG SYSTEM FOR SPIN CAST REELS

This is a continuation of application Ser. No. 223,736 filed Jan. 9, 1981, now abandoned.

DESCRIPTION

1. Technical Field

This invention relates to spinning style fishing reels and, more particularly, to a star wheel actuated drag assembly for infinitely controlling line tension.

2. Background Art

Spinning-type fishing reels have had many different styles and types of drag assemblies for varying tension in a line. One such device is shown in U.S. Pat. No. 3,105,651 to Hull, issued Oct. 1, 1963, wherein a drag is provided on the line spool by means of a leaf spring bearing on serrations on a line spool. A stepped cam engages the leaf spring and as the cam is moved, the loading of the spring on the spool is increased or decreased. The steps on the cam control the tension which is not always just the tension desired. In addition, the spring and serrations constantly wear on each other requiring repair or replacement.

In U.S. Pat. No. 3,088,691 to Hull, issued May 7, 1963, a star wheel is used to translate an actuator which pivots a pair of links to close a brake sleeve around a hub. The drag is controlled by the degree of binding of the sleeve on the hub. The links are subject to binding and the location and operation of the brake sleeve needlessly complicates the reel design.

U.S. Pat. No. 3,481,554 to Hull, issued Dec. 2, 1969, uses a thumb wheel to pivot links to open and close a brake member on the spool to vary the drag on the spool. Once again, the system works well, but has many moving parts which complicate the structure and increases costs.

The present invention is directed to overcoming one or more of the problems as set forth above.

DISCLOSURE OF INVENTION

This invention relates to spinning style fishing reels and comprehends a simple, but effective, drag assembly for varying the drag on the line spool. A star wheel is used to rotate a threaded post which moves a drag actuator in a radial direction along a ramp cam on a drag plate. Depending on the location of the drag actuator on the cam determines the amount of drag force applied to the spool.

The threaded post and drag actuator are the only moving parts on the drag assembly so that there is little wear, virtually no source for malfunction and yet the forces transmitted to the drag plate supply an infinite variation in drag on the spool. The drag assembly is relatively inexpensive to manufacture, is simple to install and is trouble-free thereby requiring little or no maintenance.

BRIEF DESCRIPTION OF DRAWINGS

FIG. 1A is a rear perspective of the gear and ratchet of the crankshaft;

FIG. 4 is an exploded perspective view of the drag actuator and drag plate;

FIG. 5 is a cross-sectional view taken along the line 5—5 of FIG. 5; and

FIG. 6 is a cross-sectional view taken along the line 6—6 of FIG. 5.

BEST MODE FOR CARRYING OUT THE INVENTION

Figure 1:
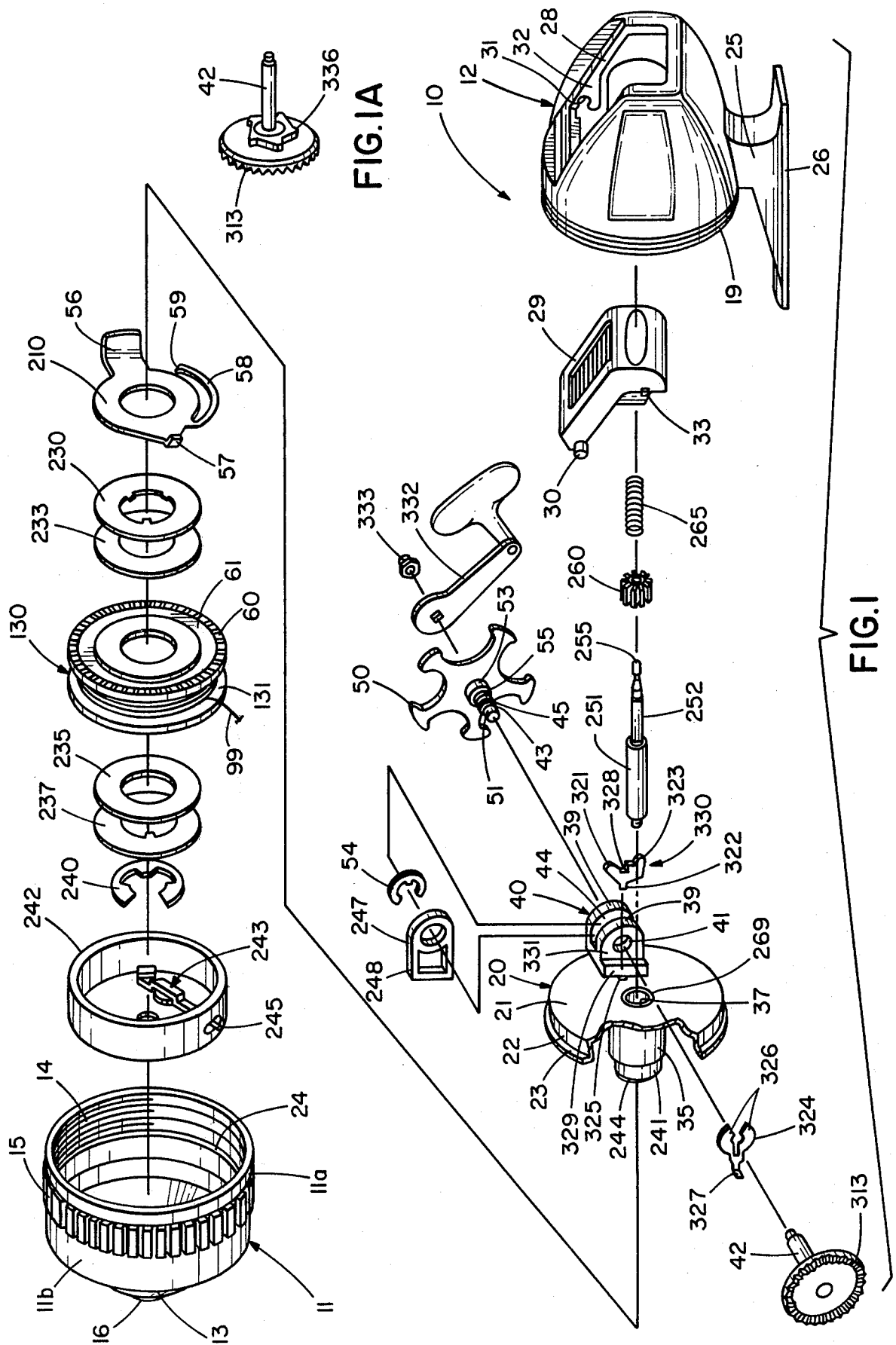
FIG. 1 is an exploded view of a reel embodying the invention.
Figure 2:
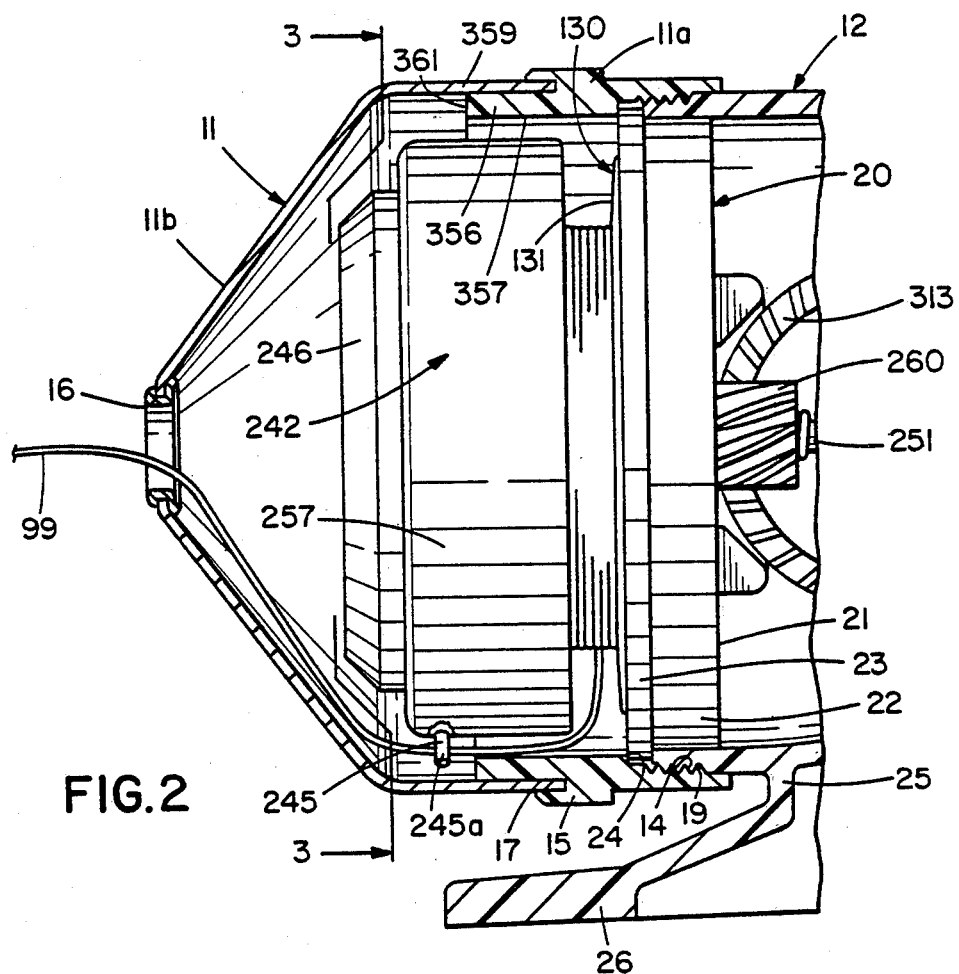
FIG. 2 is a cross-sectional view taken along the line 2—2 of FIG. 3.
Figure 3:
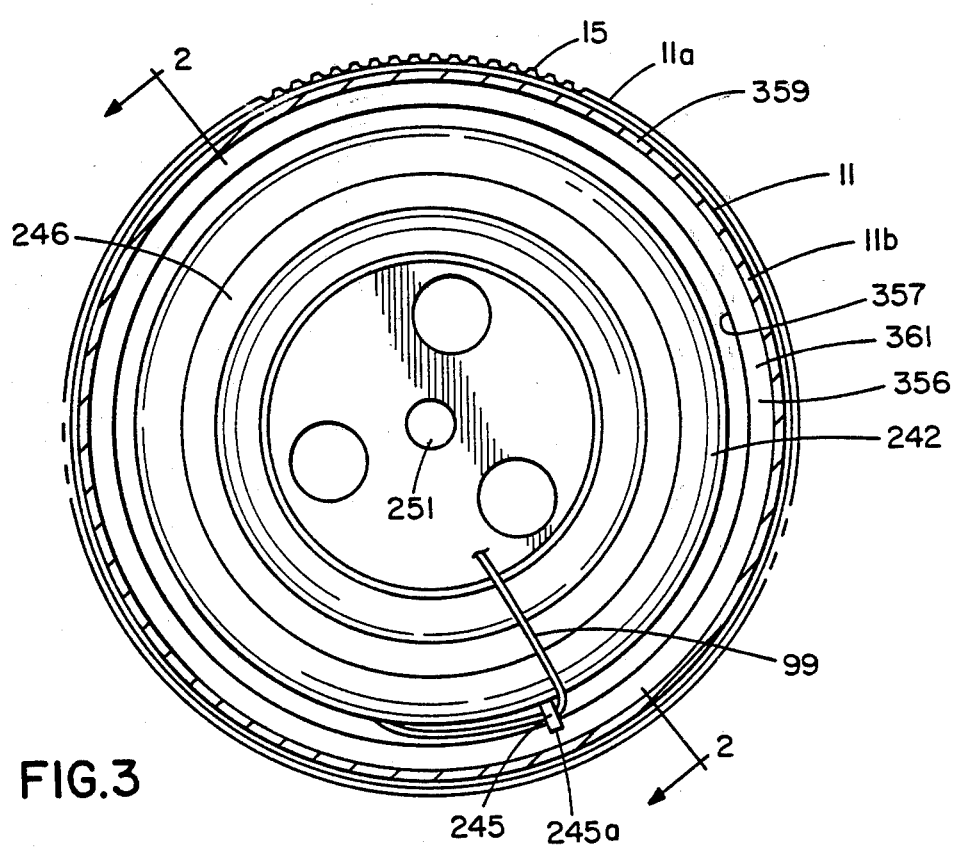
FIG. 3 is a cross-sectional view taken along the line 3—3 of FIG. 2.

Referring first to FIG. 1, there is shown a reel, including a closed face housing 10, having a two-part front cup-shaped cover 11 and a rear cup-shaped cover 12. The front cover 11 has a ring or cylindrically-shaped first part 11a and a cone-shaped second part 11b. The ring or cylindrically-shaped first part 11a of the front cover 11 is molded from a high impact strength plastic, such as ABS. The cone-shaped second part 11b of the front cover 11 is formed of metal, such as aluminum. The rear cover 12 can be formed of a platable grade ABS with a chrome or nickel plating. The cone-shaped second part 11b has a generally annular rearward edge portion engaging in a forwardly facing locking groove 17 formed on the second part 11b of the cover 11. The cone-shaped second part 11b has means for rigidly locking the second part 11b to the first part 11a. The cone-shaped second part 11b of the cover 11 has a conical front portion 13 including a circular line opening which mounts an annular line guide 16 in a known manner. The cylindrical first part 11a of the front cover 11 has helical threads 14 formed on the rearmost internal surface thereof and has knurled gripping portions 15 formed on the external surface thereof.

A reel body 20 is provided and includes a circular mounting plate or deck plate 21 which has a forwardly extending cylindrical sleeve portion 22 integrally formed around the outer periphery thereof. The reel body 20 may be made of plastic material, such as ABS or a glass filled polycarbonate. The forward edge of the sleeve 22 has a flange 23 extending radially outwardly beyond the outer surface of the sleeve portion 22. The cylindrical first part 11a of the front cover 11 is undercut rearward of the internal thread 14 to provide a rearwardly facing shoulder 24 axially spaced from the end of the internal thread 14. The reel body 20 with the radially extending flange 23 is inserted in the rear opening of the front cover 11 with the flange 23 bearing against the shoulder 24 in the undercut portion. The rear cover 12, which has on its forwardly facing end portion an external thread 19, is threaded into the internal thread 14 of the front cover 11 until the forwardly facing edge of the rear cover 12 engages the radially outwardly extending flange 23 to trap the reel body 20 between the front cover 11 and the rear cover 12. The rear cover 12 has an integrally molded, radially extending stem 25 with a mounting foot 26 on the outer end thereof fo attachment to the appropriate part of a fishing rod. The mounting foot 26 is to be attached to the upper surface of a fishing rod for use.

The rear cover 12 has a rearwardly facing opening 28 that is substantially rectangular in shape extending through a sloped upper portion and vertical rear portion thereof. A one-piece thumb button 29 has a shape substantially mating with the shape of the opening 28 in the rear cover 12 and has a pair of sidewardly extending pivots 30 on the upper forward side edges thereof which snap into slotted pivot opening 31 formed in the adjacent side walls 32 of the opening 28. A pair of sidewardly extending tabs 33 are formed on the lower side edges of the thumb button 29 such that with the thumb button 29 assembled from the inside of the rear cover 12, the sidewardly extending pivots 30 will snap into the slotted openings 31 in the walls 32 of the rear cover 12 with the sidewardly extending tabs 33 abutting a vertical inner surface of the rear cover 12 adjacent the opening 28. The tabs 33 prevent the thumb button 29 from pivoting rearwardly out of the opening 28 in the rear cover 12.

A central hub 35 is carried by and projects forward of the deck plate 21 concentric with the sleeve 22 with a drag plate 210, back spool washer 230, back flat drag washer 233, spool assembly 130, front flat drag washer 235, front spool washer 237, all retained on the hub 35 by means of spool retainer clip 240 which fits into a groove (not shown in FIG. 1) aligned with a shoulder separating the hub 35 from a reduced diameter front portion 241 of hub 35.

A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The center shaft 251 is slidably and rotatably mounted in the sleeve bearing 269 in the deck plate 21. A pinion gear 260 is splined on a reduced diameter spined portion 252 of the center shaft 251 and is resiliently maintained in a forward position against the deck plate 21 by a center shaft spring 265. The spring 265 bears against an abutting end 255 on the center shaft 251 to urge the pinion gear 260 against the deck plate 21 and to urge the center shaft 251 in a rearward direction relative to the deck plate 21. The splined connection between the pinion gear 260 and center shaft 251 permits the axial sliding motion of the shaft 251 relative to the pinion gear 260 while at the same time rotation of the pinion gear 260 will rotate the center shaft 251.

Depressing the thumb button 29 moves the center shaft 251 and spinner head assembly 242 forward relative to the hub 35. As the spinner head assembly 242 moves forward, a pickup pin mechanism 243, mounted on spinner head assembly 242, will move forward of and will disengage from the front portion 241 of the hub 35 and from a cam 244 on the axial face of the front portion 241 of the hub 35 thereby retracting a pickup pin 245 from its extended position radially outward of the spinner head assembly 242. With the thumb button 29 fully depressed, a line brake member (not shown in FIG. 1) on the forward face of the spinner head assembly 242 will be urged against the inside of the cone-shaped part 11b of the front cover 11 to trap the line 99 therebetween to prevent casting of the line from the reel. Releasing the pressure on the thumb button 29 will maintain the spinner head assembly 242 in a forward casting position, but the spring 265 will retract the center shaft 251 and the spinner head assembly 242 enough to unclamp the line 99 whereby the spinner head assembly 242 will not interfere with the fishing line 99 which can then be cast freely from the reel.

The deck plate 21 also includes a rearwardly projecting boss 40 having spaced apart legs 39 with aligned transverse openings 41 therethrough for receiving, in a concentric manner, a crankshaft 42 surrounded, in part, by a cylindrical post 43. The boss 40 has a slot 44 between the legs 39, which slot 44 extends transverse to the axis of the opening 41. The slot 44 aligns with a slot (not shown in FIG. 1) in the deck plate 21 with a slide drag actuator 247 positioned in the slots and being threadably engaged with a threaded portion 45 of the post 43. The drag actuator 247 extends through the aligned slots and forward of the deck plate 21 and is moved by rotation of the post 43 in a direction along the axis of the post 43 between the spaced apart legs 39 of the boss 40. The degree of drag braking pressure applied to the spool 131 through the drag actuator 247 is selectively and precisely controllable through a star wheel 50 mounted on the post 43 where the post 43 projects outward of the boss 40. The post 43 has spaced bearing surfaces 51 and 53 which seat in the openings 41. A retainer clip 54 engages in a slot 55 at the junction between the bearing surface 53 and the threads 45 on the post 43, which slot 55 aligns with one wall of the slot 44 so that the star wheel 50 and post 43 can be rotated relative to the boss without the post 43 moving axially relative to the boss 40.

The projecting contact head 248 of the drag actuator 247 engages with an arcuately curved extended ramp cam 56 on the drag plate 210. The drag plate 210 has an anchoring tab 57 located diametrically opposite the cam 56, which tab 57 engages in a recess (not shown in FIG. 1) in the frong surface of the deck plate 21. A cantilever arm 58 has a peripheral connection with the drag plate 210 and extends along an arc parallel to a peripheral portion of the drag plate 210. The cantilever arm 58 has an axially facing tip 59 engaging with serrations 60 on the axially facing surface of one flange 61 of the spool 131. The drag plate 210 bears against the back spool washer 230, back flat drag washer 233, spool assembly 130, frong flat drag washer 235, front spool washer 237, all of which are backed against the fixed retainer clip 240. The contact head 248 of the drag actuator 247 engages with the cam 56 and, as it is moved radially outward of the drag actuator 247, the pressure or drag on the spool 131 will be increased and, as the drag actuator 247 is moved radially inward on the cam 56, the pressure or drag on the spool 131 will be decreased. The drag actuator 247 is advanced or moved radially inward (decreased drag) by rotating the star wheel 50 in one direction and is retracted or moved radially outward (increased drag) by rotating the star wheel 50 in the opposite direction.

The crankshaft 42, with a gear 313 attached at one end, is inserted through the post 43 in the boss 40 and has a handle 332 attached by means of a nut 333 to the other end of said crankshaft 42. The gear 313 meshes with the pinion gear 260 on the center shaft 251 so that rotation of the crank handle 332 will rotate the center shaft 251 and spinner head assembly 242.

An anti-reverse assembly 330, which is associated with the crankshaft 42, includes a ratchet 336, shown in FIG. 1A, fixed on the back of the gear 313 for rotation with the gear 313 and crankshaft 42. The anti-reverse assembly 330 further includes a pivotable pawl 321 having a pivot tab 322, a pawl tooth 323, and a pawl actuator 324. The pawl pivot tab 322 extends into a slot 325 formed in deck plate 21, the slot 325 having one wall in alignment with the one wall 329 which is offset radially inward toward the center shaft 251 from the end face 331 of the boss 40. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the midportion of the pawl 321. The pawl 321 with the pivot tab 322 in the slot 325 will have one face of the pawl 321 against the wall 329 of the boss 40 and will have the pawl tooth 323 aligned with the ratchet 336. The crankshaft 42, when telescope in the post 43 and boss 40, will locate the pawl actuator 324 between the ratchet 336, fixed on the back face of gear 313, and the end face 331 of the boss 40 in the vicinity of the opening 41 in the boss 40, so that the pawl actuator 324 is offset slightly from the pawl 321 with the transverse actuator tab 327 engaged in the recess 328 of the pawl 321. Rotation of the crank handle 332 in a counterclockwise direction, as viewed in FIG. 1, will pivot the crankshaft 42 and the pawl actuator 324 in a counterclockwise direction which will pivot the pawl 321 in a clockwise direction around pawl pivot tab 322 to move the pawl tooth 323 out of alignment with the teeth of the ratchet 336. The crank handle 332 will, therefore, be permitted to be rotated in the direction without interference. The gripping resistance between the pawl actuator 324 and the crankshaft 42 will be overcome as soon as the pawl 321 pivots to its extreme position, whereupon the crankshaft 42 continues to rotate relative to the pawl actuator 324. Rotation of the handle 332 in the clockwise direction moves the pawl actuator 324 in the clockwise direction with the tab 327 pivoting the pawl 321 in a counterclockwise direction to move the pawl tooth 323 into the path of the ratchet teeth to stop further rotation of the crankshaft 42 and handle 332 in that direction.

Referring more particularly to FIGS. 4, 5 and 6, the drag plate 210 (shown removed from the reel in FIG. 4) includes a body portion 62 with an aperture 63 through the center thereof through which the hub 35 extends. The anchoring tab 57 extends transverse to the body portion 62 and is inserted (FIG. 6) in recess 65 in the deck plate 21. The ramp cam 56 curves or bends out of the plane of the body portion 62 on the same side of the drag plate 210 as tab 57 and is located diametrically opposite to the tab 57. As best illustrated in FIG. 6, the body portion 62 of the drag plate 210 is bent, at about its midportion, in a direction away from the direction of the tab 57 and cam 56 so that when assembled on the hub 35 with tab 57 in recess 65, a space will be provided between the deck plate 21 and the body portion 62 with the body portion 62 engaging the back spool washer 230 and the cam 56 engaging the drag actuator 247.

Drag assembly 220 (FIG. 6) has the star wheel 50 attached to the one end of post 43 with the drag actuator 247 mounted on the threaded portion 45. The star wheel 50 rotates the post 43 and is abutted against the end face of the one leg 39 of the boss 40. The slot 55 in the post 43 aligns with the inner face of the same one leg 39 of the boss 40 so that with retainer clip 54 in the slot 55, the bearing surfaces 51, 53 on the post 43 are positioned in the legs 39 of the boss 40 whereupon the post 43 may be rotated in the boss 40, but will not move axially relative to the boss. Rotation of the star wheel 50 and post 43 will move the drag actuator 247 along the longitudinal axis of the post. The drag actuator 247 extends through the slot 44 in the deck plate 21 and contacts the upper and/or lower surfaces of slot 44 so as to be restrained against rotation relative to the post 43 thereby receiving the longitudinal motion along the post. The drag actuator 247 will contact the upper surface of the slot 44 when the star wheel 50 is rotated counterclockwise and will contact the lower surface of the slot 44 when rotated clockwise. The contact head 248 on the drag actuator 247 engages with the cam 56 on the drag plate 210. As shown, turning the star wheel 50 in a clockwise direction will move the drag actuator 247 toward the star wheel 50 which will move the contact head 248 outward on the cam 56 on the drag plate 210 to depress the cam 56 which will increase the pressure applied by the drag plate 210 on the spool washers 230, 237 and drag washers 233,235 to increase the friction or drag on the spool 131. Turning the star wheel 50 counterclockwise will move the drag actuator 247 away from the star wheel 50 which, in turn, will move the contact head 248 inward on the cam 56 to release the cam 56 which will decrease the load on the drag plate 210 thereby reducing the pressure and friction or drag on the spool 131.

The star wheel 50 and post 43 affords an infinite amount of adjustment to the drag assembly 220 so that each fisherman can select the desired drag for his individual requirements and under his set of conditions. The drag assembly 220 has a minimum number of parts all of which are relatively simple to manufacture and all of which interfit with maximum tolerance variations while still providing a highly efficient, infinitely adjustable drag assembly.

Other aspects, objects and advantages of this invention can be obtained from a study of the drawings, the disclosure and the appended claims.

I claim:

1. In a spinning reel including a cylindrical reel body having a deck plate, a forwardly extending hub affixed to the deck plate and having an opening therethrough, a spool supported on the hub forwardly of the deck plate, a center shaft extending axially through the opening in the deck plate and the hub, a crank drive mechanism mounted in the reel body for rotating the center shaft, the improvement including:
    (a) bracket means extending rearwardly from the deck plate and having aperture means therein;
    (b) an externally threaded post means mounted in the aperture means in the bracket means and having a longitudinal axis lying substantially parallel to the deck plate, the axis of the post means lying radially of the center shaft;
    (c) a wheel affixed to the post means;
    (d) a drag plate having a body portion supported between the deck plate and the spool and applying pressure to the spool, the drag plate having a cam surface angled upwardly and outwardly away from the body portion of the drag plate;
    (e) a drag actuator mounted on the post means for movement radially along the longitudinal axis of the post means;
    (f) a contact head on the drag actuator extending through the deck plate and into contact with the cam on the drag plate, rotation of the wheel advances or retracts the drag actuator radially along the cam surface on the drag plate to increase or decrease the pressure applied by the drag plate on the spool.

2. In a spinning reel as claimed in claim 1 wherein the drag plate has means for anchoring the drag plate to the deck plate at a point diametrically opposite the cam on the drag plate.

3. In a spinning reel as claimed in claim 2 wherein the means for anchoring the drag plate is a transverse tab on the drag plate extending into a recess in the deck plate.

4. In a spinning reel as claimed in claim 2 wherein the drag plate is of resilient leaf spring construction.

5. In a spinning reel as claimed in claim 4 wherein the resilient leaf spring is shaped to exert a bias force toward the spool.

6. In a spinning reel as claimed in claim 1 wherein the post means is hollow and extends outwardly from the bracket means and wherein the wheel is a star wheel and is affixed to the outwardly extending portion of the post means.

7. In a spinning reel as claimed in claim 1 wherein an opening is provided in the deck plate for receiving the drag actuator, the drag actuator engaging opposite walls of the opening to restrain rotation of the drag actuator as the drag actuator is moved along the axis of the post means.

8. In a spinning reel comprising a reel body having a deck plate, a bracket mounted on said deck plate and projecting rearwardly from said deck plate, a pair of spaced legs on the bracket with aligned openings therein, a slot formed in the deck plate in alignment with an open space between the legs of the bracket, a hub on the deck plate and projecting forward thereof, means for securing a spool on the hub and permitting rotation of the spool relative to the hub, a drag assembly for the spool comprising:

(a) a drag plate having a body portion with a periphery, the body portion having a center hole receiving the hub, (b) a tab on the drag plate and being anchored to the reel body, (c) a cam on the drag plate and projecting out of the plane of the body portion in the direction of the deck plate, (d) a hollow externally threaded post means mounted in the aligned openings in the legs of the bracket and extending outward from the bracket, (e) wheel means on the post means for rotating the post means relative to the bracket, and (f) means for varying the amount of drag applied to the drag plate, said means comprising a drag actuator carried by the post means and projecting through the slot in the deck plate, the drag actuator having one end portion threadingly engaged by the threaded post means and having the other end portion in engagement with the cam on the drag plate, whereby rotation of the wheel means will move the drag actuator along the cam on the drag plate to increase or decrease the drag on the spool.

9. In a spinning reel as claimed in claim 8 wherein the cam is located on the periphery of the drag plate diametrically opposite to the tab.

10. In a spinning reel as claimed in claim 9 wherein the tab engages in a recess in the deck plate to provide the anchor for the drag plate to the deck plate.

11. In a spinning reel as claimed in claim 8 wherein the slot in the deck plate has spaced side walls parallel to the axis of the post means, the drag actuator contacting one or the other of the side walls to prevent rotation of the drag actuator so that the drag actuator will advance or retract along the axis of the post means.

* * * * *